Dec. 29, 1931.     F. H. HETZER     1,838,257
PLANT LIFTER
Filed April 13, 1931     2 Sheets-Sheet 1
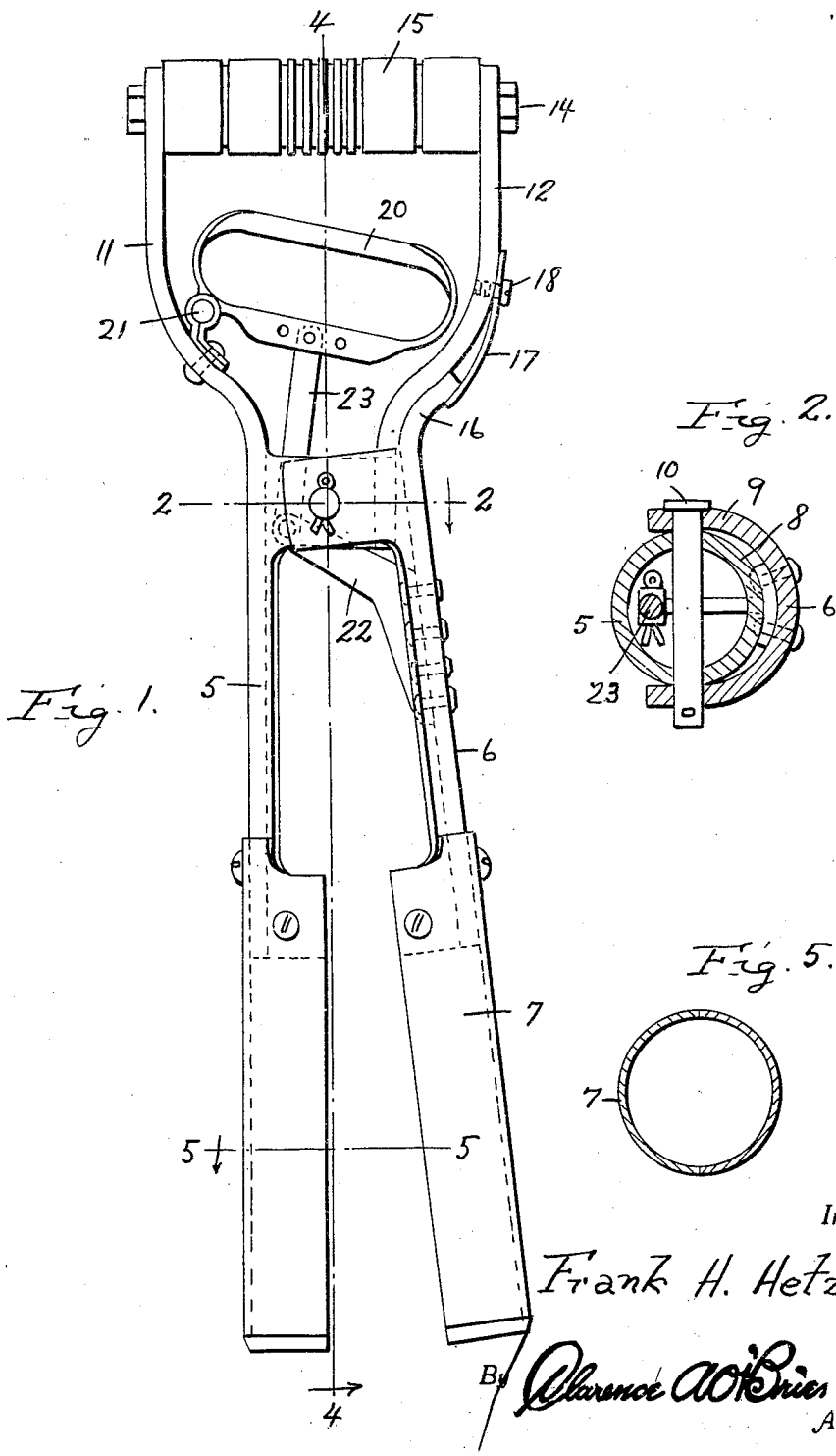
Inventor
Frank H. Hetzer
By Clarence A. O'Brien
Attorney Dec. 29, 1931.  F. H. HETZER  1,838,257
PLANT LIFTER
Filed April 13, 1931  2 Sheets-Sheet 2

Inventor

Frank H. Hetzer

By Clarence A. O'Brien
Attorney

Patented Dec. 29, 1931

1,838,257

UNITED STATES PATENT OFFICE

FRANK H. HETZER, OF COLUMBUS, OHIO

PLANT LIFTER

Application filed April 13, 1931. Serial No. 529,840.

The present invention relates to a device for lifting plants and transplanting plants and has for its prime object to provide a small hand operating device of this nature which is useful in taking plants from plant beds and placing them in pots or in the ground without disturbing the roots.

Another very important object of the invention resides in the provision of a device of this nature which is exceedingly simple in construction, inexpensive to manufacture, strong and durable, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of a device embodying the features of my invention.

Figure 2 is a transverse section taken substantially on the line 2—2 of Figure 1.

Figure 5 is a sectional view taken substantially on the line 5—5 of Figure 1 but showing the blades closed.

Figure 3:
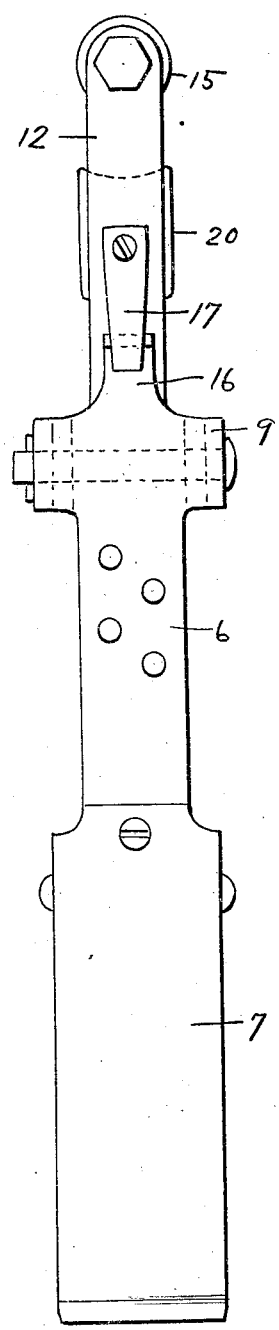
Figure 3 is another side elevation taken at right angles to that shown in Figure 1.
Figure 4:
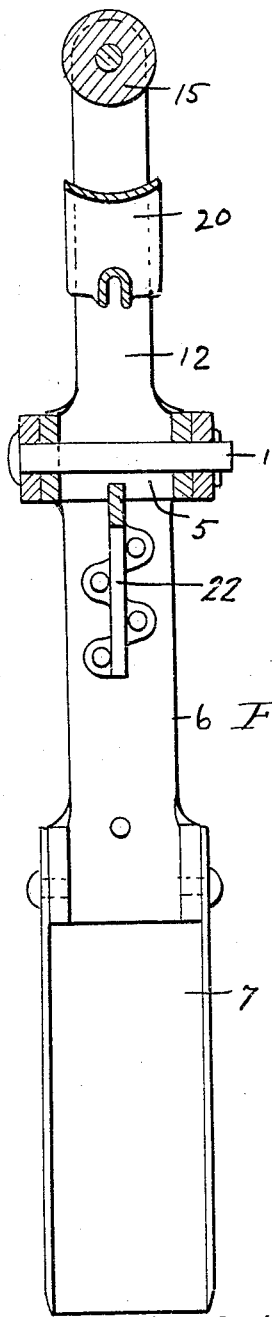
Figure 4 is a longitudinal section taken substantially on the line 4—4 of Figure 1.

Referring to the drawings in detail it will be seen that numerals 5 and 6 denote a pair of shanks which are arcuate in cross section. Fixed to the lower ends of the shanks 5 and 6 are semi-cylindrical blades 7 the lower ends of which are sharpened. A circular projection 8 is formed on the shank 5 while an arcuate projection 9 is formed on the shank 6 to extend over or circumjacent the projection 8 and a pin 10 extends through openings in these projections 8 and 9 to permit rocking of the shanks with respect to each other. The shank 5 is formed with an upwardly extending extension 11 which is offset outwardly. A member 12 shaped similarly to the member 11 is secured thereto by means of a bolt 14 and a grip 15 is disposed about the bolt 14 between the extension 11 and the member 12. An upwardly and outwardly relatively short extension 16 is formed on the shank 6 and abuts the member 12 when the blades 7 are in open position. A spring 17 is attached as at 18 to member 12 and engages against the extension 16 for normally holding the blades in open position. An oblong loop like handle member 20 is rockably mounted as at 21 on the inner side of the extension 11. An arm 22 is fixed to the shank 6 to extend inwardly therefrom and a link 23 is pivoted to the end of this arm 22, extends through the circular projection 8 and is pivoted to the handle like member 20. Therefore when the handle like member 20 is swung upwardly toward the grip 15 as may be accomplished with the fingers of the hand on the grip 15, the blades are closed or urged to closed position so that the dirt about a plant may be maintained on the plant as it is being transplanted. As soon as the member 20 is released then the spring 17 will cause the blades to open.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arragement of parts may be resorted to without departing from the spirit or scope of the invention as hereinafter claimed or sacrificing any of its advantages.

Having thus described my invention, what I claim as new is:

1. A transplanting tool comprising a pair of shanks pivotally connected together, a semi-circular elongated lathe connected to the lower end of the shank, one shank having an upper extension, a hand grip connected at one end to the upper end of said extension, a depending member connected to the other end of the hand grip, the other shank having its upper end contacting the outer face of said depending member, springs carried by said depending member and engaging the said upper end of the shank for normally holding the blades spaced apart and a member connected with the last mentioned shank below the pivotal point and located between the extension and the depending member and pivoted to the extension for moving the blades toward each other when said member is moved toward the hand grip.

2. A transplanting tool comprising a pair of elongated shanks pivotally connected together, a blade connected to the lower end of each shank, one shank having an upwardly extending extension at its upper end and the other shank having a short extension at its upper end, a hand grip having one end connected to the upper end of the long extension, a member depending from the other end of the hand grip and engaging the inner face of the short extension, a spring carried by the depending member adjacent the short extension for normally holding the shank with the blades spaced apart, an arm connected to the shank carrying the short extension and extending inwardly between the shanks, a handle member pivoted to the long extension and located between the same and the depending member and a link connecting said handle member to the inner end of the arm.

3. A transplanting tool comprising a pair of shanks pivotally connected together, blades at the lower ends of the shank, an arm connected to one shank and extending inwardly into the space between the shanks, a handle member pivoted to the other shank above the pivotal point, and a link connecting the handle member to the inner end of the arm.

In testimony whereof I affix my signature.

FRANK H. HETZER.